United States Patent
Lan et al.

(10) Patent No.: US 9,921,432 B2
(45) Date of Patent: Mar. 20, 2018

(54) MANUFACTURING METHOD FOR VA TYPE LCD PANEL

(71) Applicant: Shenzhen China Star Optoelectronics Technology Co., Ltd., Shenzhen (CN)

(72) Inventors: Song Lan, Shenzhen (CN); Xiaolong Ma, Shenzhen (CN); Yungjui Lee, Shenzhen (CN); Xiufen Zhu, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 154 days.

(21) Appl. No.: 14/913,371

(22) PCT Filed: Dec. 28, 2015

(86) PCT No.: PCT/CN2015/099271
§ 371 (c)(1),
(2) Date: Feb. 21, 2016

(87) PCT Pub. No.: WO2017/063291
PCT Pub. Date: Apr. 20, 2017

(65) Prior Publication Data
US 2017/0261818 A1     Sep. 14, 2017

(30) Foreign Application Priority Data
Oct. 15, 2015 (CN) .......................... 2015 1 0669792

(51) Int. Cl.
*G02F 1/1337* (2006.01)

(52) U.S. Cl.
CPC .. *G02F 1/133788* (2013.01); *G02F 1/133711* (2013.01); *G02F 2001/133726* (2013.01); *G02F 2001/133742* (2013.01)

(58) Field of Classification Search
CPC ................. G02F 1/13378; G02F 2001/133726
(Continued)

(56) References Cited

U.S. PATENT DOCUMENTS

| | | | | |
|---|---|---|---|---|
| 2001/0012596 A1* | 8/2001 | Kunimoto | ............. | A61K 6/083 430/138 |
| 2002/0036739 A1* | 3/2002 | Shuto | ............... | G02F 1/133711 349/123 |

(Continued)

FOREIGN PATENT DOCUMENTS

| | | |
|---|---|---|
| CN | 102216839 A | 10/2011 |
| CN | 102955294 A | 3/2013 |
| TW | I250346 B | 3/2006 |

*Primary Examiner* — Christopher Raabe
(74) *Attorney, Agent, or Firm* — Leong C. Lei

(57) ABSTRACT

The invention provides a manufacturing method for VA type LCD panel. The manufacturing method of the present invention adds a photo-initiator and a polymeric monomer to LC material, and uses UV light to irradiate through a mask so that the polymeric monomer polymerizes in accordance with the mask pattern to form polymer protrusions on the array substrate side to achieve the effect similar to protrusion or slit. The method is applicable for the LC molecules to form the pre-tilt angle so that the LC molecules in the panel are lined up along the normal direction. The method is simple, eliminates ITO etching process on the array substrate side, and reduces costs.

13 Claims, 3 Drawing Sheets

(58) Field of Classification Search
USPC .............................................................. 445/6
See application file for complete search history.

(56) References Cited

U.S. PATENT DOCUMENTS

| | | | | |
|---|---|---|---|---|
| 2006/0250556 | A1* | 11/2006 | Kataoka | ............ G02F 1/133707 |
| | | | | 349/129 |
| 2007/0042279 | A1* | 2/2007 | Kataoka | ................ G02F 1/1393 |
| | | | | 430/7 |
| 2007/0152221 | A1* | 7/2007 | Sasabayashi | ..... G02F 1/133707 |
| | | | | 257/59 |
| 2011/0267574 | A1* | 11/2011 | Kawahira | ......... G02F 1/133711 |
| | | | | 349/158 |
| 2012/0249940 | A1* | 10/2012 | Choi | ................. G02F 1/133753 |
| | | | | 349/123 |
| 2012/0292568 | A1* | 11/2012 | Kuriyama | .............. C09K 19/12 |
| | | | | 252/299.63 |
| 2013/0128201 | A1* | 5/2013 | Noma | .............. G02F 1/133753 |
| | | | | 349/123 |
| 2014/0110868 | A1* | 4/2014 | Rho | ................. G02F 1/133711 |
| | | | | 264/1.38 |
| 2015/0362802 | A1* | 12/2015 | Wu | ................... G02F 1/133711 |
| | | | | 349/106 |
| 2016/0026041 | A1* | 1/2016 | Lim | .................... C09K 19/348 |
| | | | | 349/43 |
| 2016/0320669 | A1* | 11/2016 | Lim | ....................... C09K 19/56 |

\* cited by examiner

MANUFACTURING METHOD FOR VA TYPE LCD PANEL

BACKGROUND OF THE INVENTION

1. Field of the Invention

The present invention relates to the field of display, and in particular to a manufacturing method for vertical alignment (VA) type liquid crystal display (LCD) panel.

2. The Related Arts

The active thin film transistor liquid crystal display (TFT-LCD) devices are growing rapidly and receive wide application. The TFT-LCD devices available on the market are mostly of the backlight type, comprising a case, a LCD panel and a backlight module disposed inside the case. The traditional structure of the LCD panel comprises a color filter (CF) substrate, a TFT array substrate, a liquid crystal (LC) layer sandwiched between two substrates, and a sealant. The working principle is to apply a driving voltage to the two glass substrates to control the rotation of the liquid crystal molecules of the liquid crystal layer to refract the light from backlight to display.

For the current mainstream TFT-LCD display market, there are three types: a twisted nematic (TN) or super twisted nematic (STN) type, an in-plane switching (IPS) type, and a vertical alignment (VA) type, wherein the VA type LCD shows a higher contrast compared to the other types, and is widely applied to large-size display, such as TV. The known VA technologies are divided into multi-domain vertical alignment (MVA) technology, patterned vertical alignment (PVA) technology, continuous pinwheel alignment (CPA) technology, and polymer stabilization vertical alignment (PSVA) technology. These VA technologies require the design for the CF substrate side or the TFT substrate side to include protrusion or slit, so that the LCD molecules have a pre-tilt angle. Because powered up, the LC molecules are lined up along the protrusion or the slit. When the power is applied, the LCD molecules on the surface of protrusion or slit start moving and carrying the LC molecules in distance to align along the same direction, so as to ensure the entire element to reach stable alignment.

However, these protrusions and slits must be produced in a certain process, such as: in MVA technology, to dispose the protrusions on the CF substrate side or the TFT substrate side, the protrusion requires a special exposure process to produce and the technical requirements on the exposure process is high; while in PSVA technology, a transparent ITO layer must be etched on the TFT substrate side to produce slits. These methods have greatly increased the complexity of the TFT-LCD manufacturing process.

SUMMARY OF THE INVENTION

The object of the present invention is to provide a manufacturing method for VA type LCD panel, which adds photo-initiator and polymeric monomer in the LC material and uses a mask so that the polymeric monomer forms a polymer protrusion on the TFT array substrate side according to the mask pattern, and is applicable for LC molecules to produce pre-tilt angle, and thereby eliminates the ITO etching process on the TFT array substrate side, and the method is simple.

To achieve the above object, the present invention provides a manufacturing method for VA type LCD panel, which comprises:

Step 1: providing a photo-initiator, a polymeric monomer having reactive mesogen able to perform polymerization reaction under UV irradiation, and an LC material; adding the photo-initiator and the polymeric monomer to the LC material to obtain an LC composition;

Step 2: infusing the LC composition into the array substrate side or the CF substrate side to form an LC layer, and performing vacuum bonding to bond the array substrate and the CF substrate to obtain an LC panel;

Step 3: providing a mask, the mask having a pattern of light-shielding regions spaced by light-transmissive regions; using UV light to shine through the mask on the array substrate side to irradiate the LC panel, so that the polymeric monomer in the LC panel polymerized under UV irradiation to form spaced polymer protrusions on the inner side of the array substrate at locations corresponding to the light-transmissive regions according to the mask pattern;

Step 4: applying a voltage to the LC panel, after the LC molecules in the LC layer of the LC panel deflecting, continuing to use UV light irradiation, so that the remaining polymeric monomer polymerized to form polymer bumps on the array substrate and CF substrate, to achieve anchoring the LC molecules; and Step 5: removing the voltage on the LC panel obtain a VA type LCD display.

In Step 1: the ratio of the photo-initiator, polymeric monomer, and the LC material is 0.1-0.5%:4-8%:91.5-95.9%.

The photo-initiators comprise one or more of azobisisobutyronitrile, peroxide dioxane class, acyl peroxide class, and lipid peroxidation class.

The polymeric monomers comprise one or more of acrylate and derivatives, methacrylate and derivatives, styrene and derivatives, epoxy resin and aliphatic amine epoxy curing agent.

The UV light emits an energy of 85-100 mW/cm$^2$.

In Step 3, the UV light irradiates for 20-30 minutes.

In Step 4, the applied voltage is 13-25V, and the irradiation period of UV light is 70-110 seconds.

In Step 5: after removing the voltage, the UV continues irradiating for 20-30 minutes to allow the remaining polymeric monomers in the LC panel to polymerize completely.

In Step 2, the LC composition is infused into the array substrate side or CF substrate side by a one drop filling approach.

the present invention provides a manufacturing method for VA type LCD panel, which comprises:

Step 1: providing a photo-initiator, a polymeric monomer having reactive mesogen able to perform polymerization reaction under UV irradiation, and an LC material; adding the photo-initiator and the polymeric monomer to the LC material to obtain an LC composition;

Step 2: infusing the LC composition into the array substrate side or the CF substrate side to form an LC layer, and performing vacuum bonding to bond the array substrate and the CF substrate to obtain an LC panel;

Step 3: providing a mask, the mask having a pattern of light-shielding regions spaced by light-transmissive regions; using UV light to shine through the mask on the array substrate side to irradiate the LC panel, so that the polymeric monomer in the LC panel polymerized under UV irradiation to form spaced polymer protrusions on the inner side of the array substrate at locations corresponding to the light-transmissive regions according to the mask pattern;

Step 4: applying a voltage to the LC panel, after the LC molecules in the LC layer of the LC panel deflecting, continuing to use UV light irradiation, so that the remaining polymeric monomer polymerized to form polymer bumps on the array substrate and CF substrate, to achieve anchoring the LC molecules; and Step 5: removing the voltage on the LC panel obtain a VA type LCD display;

wherein in Step 1: the ratio of the photo-initiator, polymeric monomer, and the LC material is 0.1-0.5%:4-8%: 91.5-95.9%;

in Step 3, the UV light irradiates for 20-30 minutes;

in Step 4, the applied voltage is 13-25V, and the irradiation period of UV light is 70-110 seconds;

in Step 5: after removing the voltage, the UV continues irradiating for 20-30 minutes to allow the remaining polymeric monomers in the LC panel to polymerize completely;

in Step 2, the LC composition is infused into the array substrate side or CF substrate side by a one drop filling approach.

Compared to the known techniques, the present invention provides the following advantages: the present invention provides a manufacturing method for VA type LCD panel. The manufacturing method of the present invention adds a photo-initiator and a polymeric monomer to LC material, and uses UV light to irradiate through a mask so that the polymeric monomer polymerizes in accordance with the mask pattern to form polymer protrusions on the array substrate side to achieve the effect similar to protrusion or slit. The method is applicable for the LC molecules to form the pre-tilt angle so that the LC molecules in the panel are lined up along the normal direction. The method is simple, eliminates ITO etching process on the array substrate side, and reduces costs.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
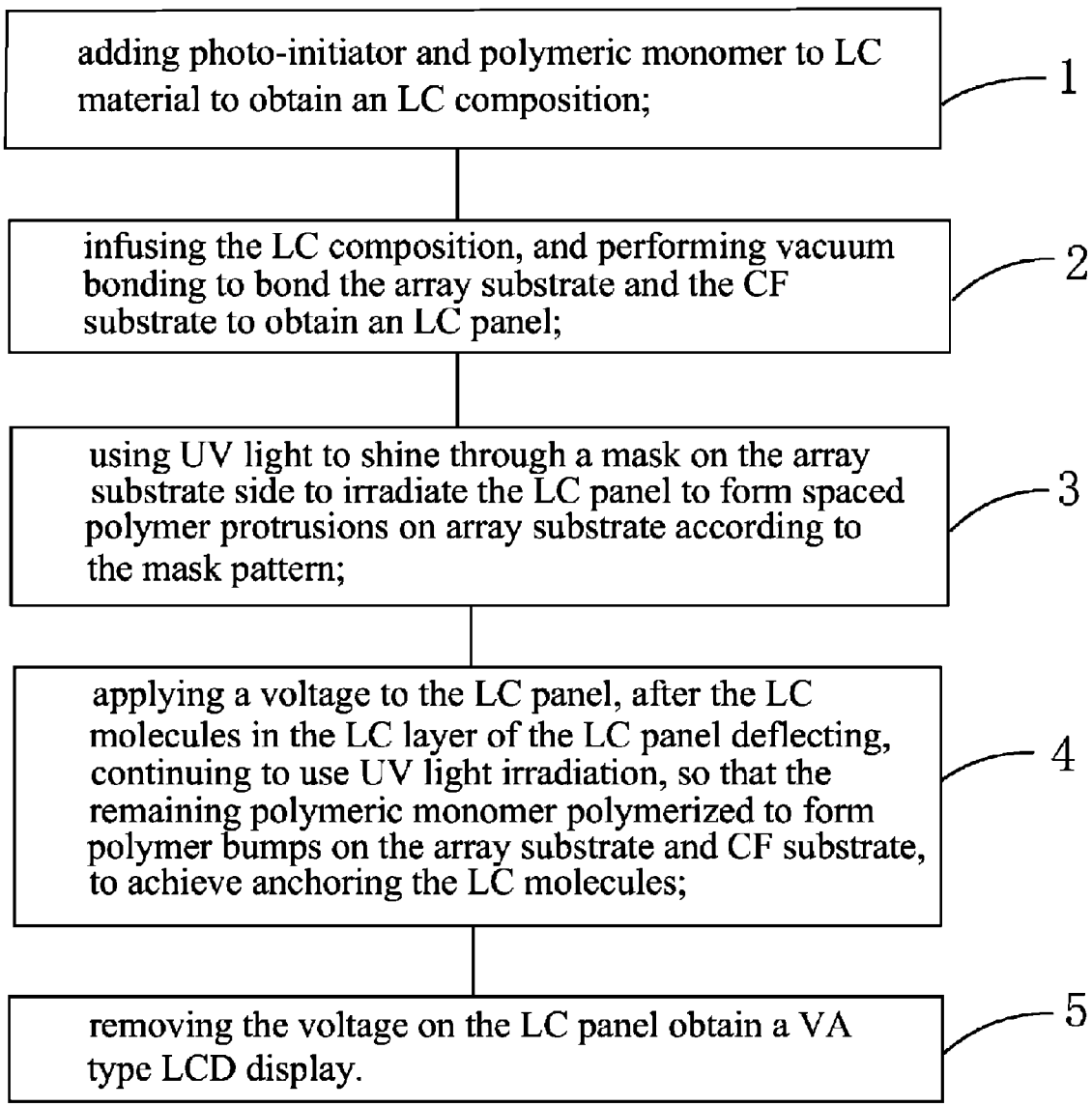
FIG. 1 is a schematic view showing the flowchart of the manufacturing method for VA type LCD panel provided by an embodiment of the present invention.

Refer to FIG. 1. The present invention provides a manufacturing method for VA type LCD panel, which comprises:

Step 1: providing a photo-initiator, a polymeric monomer 31 having reactive mesogen (RM) able to perform polymerization reaction under UV irradiation, and an LC material; adding the photo-initiator and the polymeric monomer to the LC material to obtain an LC composition according to the ratio of the photo-initiator, polymeric monomer, and the LC material 0.1-0.5%:4-8%:91.5-95.9%.

Specifically, the photo-initiators comprise one or more of azobisisobutyronitrile, peroxide dioxane class, acyl peroxide class, and lipid peroxidation class; and the polymeric monomers comprise one or more of acrylate and derivatives, methacrylate and derivatives, styrene and derivatives, epoxy resin and aliphatic amine epoxy curing agent.

Step 2: using a one drop filling (ODF) approach to infuse the LC composition into the array substrate 10 side or the CF substrate 20 side to form an LC layer, and performing vacuum bonding to bond the array substrate 10 and the CF substrate 20 to obtain an LC panel.

Figure 2:
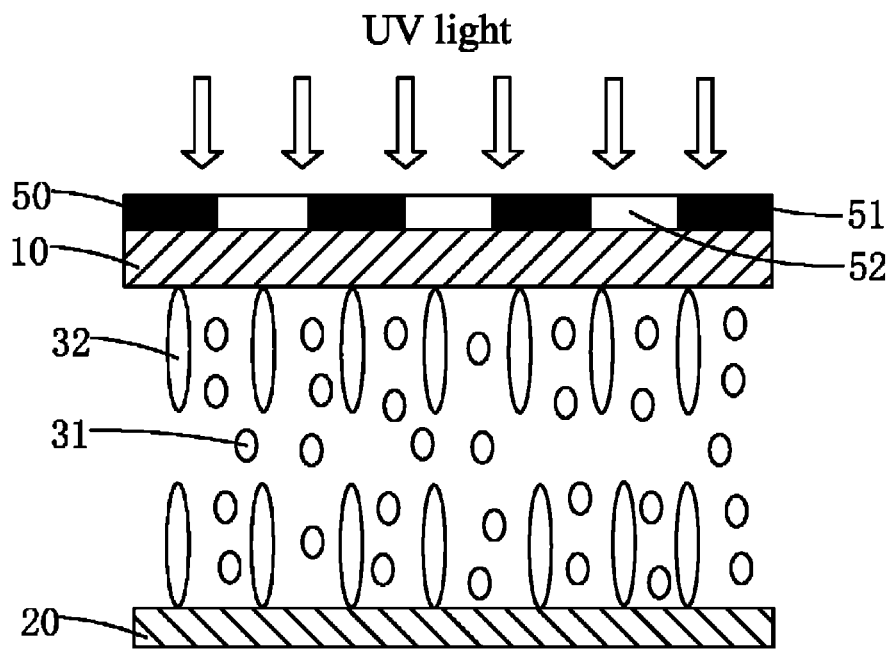
FIG. 2 is a schematic view showing Step 3 of the manufacturing method for VA type LCD panel provided by an embodiment of the present invention.
Figure 3:
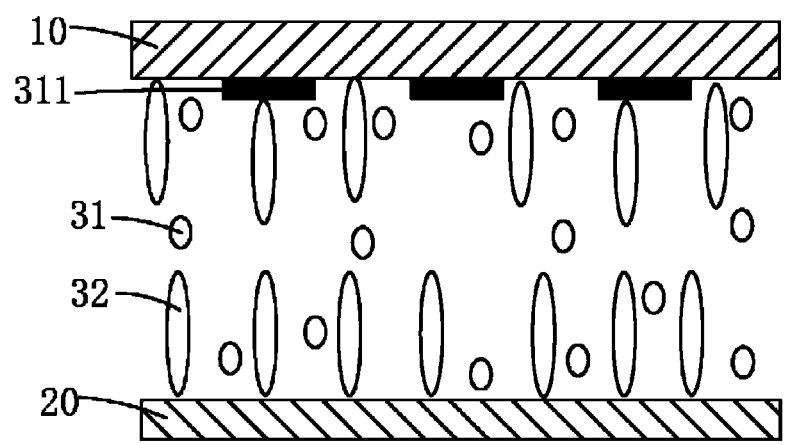
FIG. 3 is a schematic view showing the polymer protrusions formed in Step 3 of the manufacturing method for VA type LCD panel provided by an embodiment of the present invention.

Step 3: as shown in FIG. 2, providing a mask 50, the mask 50 having a pattern of light-shielding regions 51 spaced by light-transmissive regions 52; using UV light of an energy of 85-100 mW/cm$^2$ to shine through the mask 50 on the array substrate side to irradiate the LC panel, the irradiation time being 20-30 minutes, so that the polymeric monomer 31 in the LC panel polymerized under UV irradiation to form spaced polymer protrusions 311 on the inner side of the array substrate 10 at locations corresponding to the light-transmissive regions 52 according to the mask pattern, as shown in FIG. 3.

Figure 4:
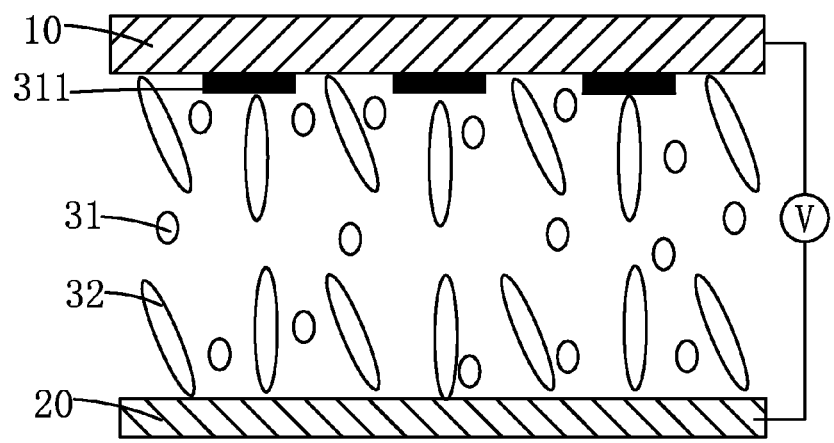
FIG. 4 is a schematic view showing Step 4 of the manufacturing method for VA type LCD panel provided by an embodiment of the present invention.
Figure 5:
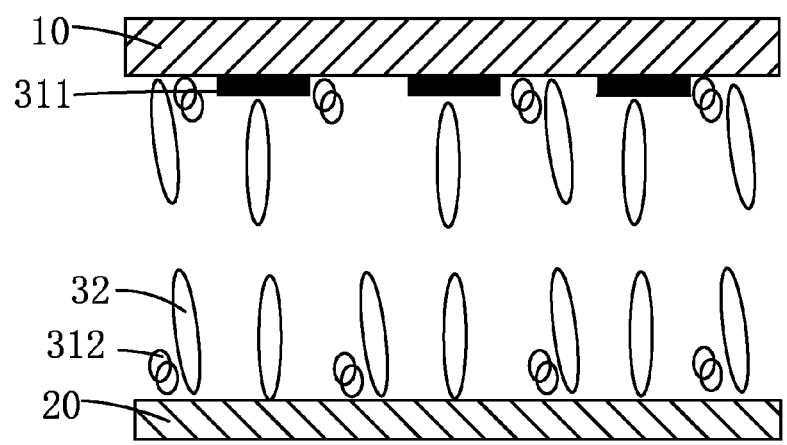
FIG. 5 is a schematic view showing the polymer bumps formed in Step 4 of the manufacturing method for VA type LCD panel provided by an embodiment of the present invention.

Step 4: as shown in FIG. 4, applying a voltage of 13-25V to the LC panel, after the LC molecules 32 in the LC layer of the LC panel deflecting, continuing to use UV light irradiation for 70-110 seconds, so that the remaining polymeric monomer 31 polymerized, as shown in FIG. 5, to form polymer bumps 312 on the array substrate and CF substrate, to achieve anchoring the LC molecules 32.

Step 5: removing the voltage on the LC panel obtain a VA type LCD display. Optionally, after removing the voltage, the UV continues irradiating for 20-30 minutes to allow the remaining polymeric monomers 31 in the LC panel to polymerize completely.

In summary, the present invention provides a manufacturing method for VA type LCD panel. The manufacturing method of the present invention adds a photo-initiator and a polymeric monomer to LC material, and uses UV light to irradiate through a mask so that the polymeric monomer polymerizes in accordance with the mask pattern to form polymer protrusions on the array substrate side to achieve the effect similar to protrusion or slit. The method is applicable for the LC molecules to form the pre-tilt angle so that the LC molecules in the panel are lined up along the normal direction. The method is simple, eliminates ITO etching process on the array substrate side, and reduces costs.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A manufacturing method for vertical alignment (VA) type liquid crystal display (LCD) panel, which comprises:
    Step 1: providing a photo-initiator, a polymeric monomer having reactive mesogen able to perform polymerization reaction under ultraviolet (UV) irradiation, and a liquid crystal (LC) material; adding the photo-initiator and the polymeric monomer to the LC material to obtain an LC composition;
    Step 2: infusing the LC composition into the array substrate side or the color filter (CF) substrate side to form an LC layer, and performing vacuum bonding to bond the array substrate and the CF substrate to obtain an LC panel;
    Step 3: providing a mask, the mask having a pattern of light-shielding regions spaced by light-transmissive regions; using UV light to shine through the mask on the array substrate side to irradiate the LC panel, so that the polymeric monomer in the LC panel polymerized under UV irradiation to form spaced polymer protrusions on the inner side of the array substrate at locations corresponding to the light-transmissive regions according to the mask pattern;
    Step 4: applying a voltage to the LC panel, after the LC molecules in the LC layer of the LC panel deflecting, continuing to use UV light irradiation, so that the remaining polymeric monomer polymerized to form polymer bumps on the array substrate and the CF substrate to achieve anchoring the LC molecules, wherein the polymer bumps that are formed the array substrate are located on two sides of each of the spaced polymer protrusions and spaced from each other by the polymer protrusions; and
    Step 5: removing the voltage on the LC panel obtain a VA type LCD display.

2. The manufacturing method for VA type LCD panel as claimed in claim 1, wherein in Step 1: the ratio of the photo-initiator, polymeric monomer, and the LC material is 0.1-0.5%:4-8%:91.5-95.9%.

3. The manufacturing method for VA type LCD panel as claimed in claim 1, wherein the photo-initiators comprise one or more of azobisisobutyronitrile, peroxide dioxane class, acyl peroxide class, and lipid peroxidation class.

4. The manufacturing method for VA type LCD panel as claimed in claim 1, wherein the polymeric monomers comprise one or more of acrylate and derivatives, methacrylate and derivatives, styrene and derivatives, epoxy resin and aliphatic amine epoxy curing agent.

5. The manufacturing method for VA type LCD panel as claimed in claim 1, wherein the UV light emits an energy of 85-100 mW/cm$^2$.

6. The manufacturing method for VA type LCD panel as claimed in claim 1, wherein in Step 3, the UV light irradiates for 20-30 minutes.

7. The manufacturing method for VA type LCD panel as claimed in claim 1, wherein in Step 4, the applied voltage is 13-25V, and the irradiation period of UV light is 70-110 seconds.

8. The manufacturing method for VA type LCD panel as claimed in claim 7, wherein in Step 5: after removing the voltage, the UV continues irradiating for 20-30 minutes to allow the remaining polymeric monomers in the LC panel to polymerize completely.

9. The manufacturing method for VA type LCD panel as claimed in claim 1, wherein in Step 2, the LC composition is infused into the array substrate side or CF substrate side by a one drop filling approach.

10. A manufacturing method for vertical alignment (VA) type liquid crystal display (LCD) panel, which comprises:
    Step 1: providing a photo-initiator, a polymeric monomer having reactive mesogen able to perform polymerization reaction under ultraviolet (UV) irradiation, and a liquid crystal (LC) material; adding the photo-initiator and the polymeric monomer to the LC material to obtain an LC composition;
    Step 2: infusing the LC composition into the array substrate side or the color filter (CF) substrate side to form an LC layer, and performing vacuum bonding to bond the array substrate and the CF substrate to obtain an LC panel;
    Step 3: providing a mask, the mask having a pattern of light-shielding regions spaced by light-transmissive regions; using UV light to shine through the mask on the array substrate side to irradiate the LC panel, so that the polymeric monomer in the LC panel polymerized under UV irradiation to form spaced polymer protrusions on the inner side of the array substrate at locations corresponding to the light-transmissive regions according to the mask pattern;
    Step 4: applying a voltage to the LC panel, after the LC molecules in the LC layer of the LC panel deflecting, continuing to use UV light irradiation, so that the remaining polymeric monomer polymerized to form polymer bumps on the array substrate and the CF substrate to achieve anchoring the LC molecules, wherein the polymer bumps that are formed the array substrate are located on two sides of each of the spaced polymer protrusions and spaced from each other by the polymer protrusions; and
    Step 5: removing the voltage on the LC panel obtain a VA type LCD display;
    wherein in Step 1: the ratio of the photo-initiator, polymeric monomer, and the LC material is 0.1-0.5%:4-8%:91.5-95.9%;
    wherein in Step 3, the UV light irradiates for 20-30 minutes; wherein in Step 4, the applied voltage is 13-25V, and the irradiation period of UV light is 70-110 seconds;
    wherein in Step 5: after removing the voltage, the UV continues irradiating for 20-30 minutes to allow the remaining polymeric monomers in the LC panel to polymerize completely;
    wherein in Step 2, the LC composition is infused into the array substrate side or CF substrate side by a one drop filling approach.

11. The manufacturing method for VA type LCD panel as claimed in claim 10, wherein the photo-initiators comprise one or more of azobisisobutyronitrile, peroxide dioxane class, acyl peroxide class, and lipid peroxidation class.

12. The manufacturing method for VA type LCD panel as claimed in claim 10, wherein the polymeric monomers comprise one or more of acrylate and derivatives, methacrylate and derivatives, styrene and derivatives, epoxy resin and aliphatic amine epoxy curing agent.

13. The manufacturing method for VA type LCD panel as claimed in claim 10, wherein the UV light emits an energy of 85-100 mW/cm$^2$.

\* \* \* \* \*